Oct. 13, 1953  H. DREYFUSS ET AL  2,655,176
CONTROL PANEL
Filed Sept. 28, 1950  4 Sheets-Sheet 1

INVENTOR.
HENRY DREYFUSS
WILLIAM WINTERBOTTOM
BY KARL L. MAIER

Arthur H. Swanson
ATTORNEY.

Oct. 13, 1953     H. DREYFUSS ET AL     2,655,176

CONTROL PANEL

Filed Sept. 28, 1950     4 Sheets-Sheet 3

INVENTOR.
HENRY DREYFUSS
WILLIAM WINTERBOTTOM
KARL L. MAIER
BY
Arthur H. Swanson
ATTORNEY.

Oct. 13, 1953  H. DREYFUSS ET AL  2,655,176
CONTROL PANEL
Filed Sept. 28, 1950  4 Sheets-Sheet 4
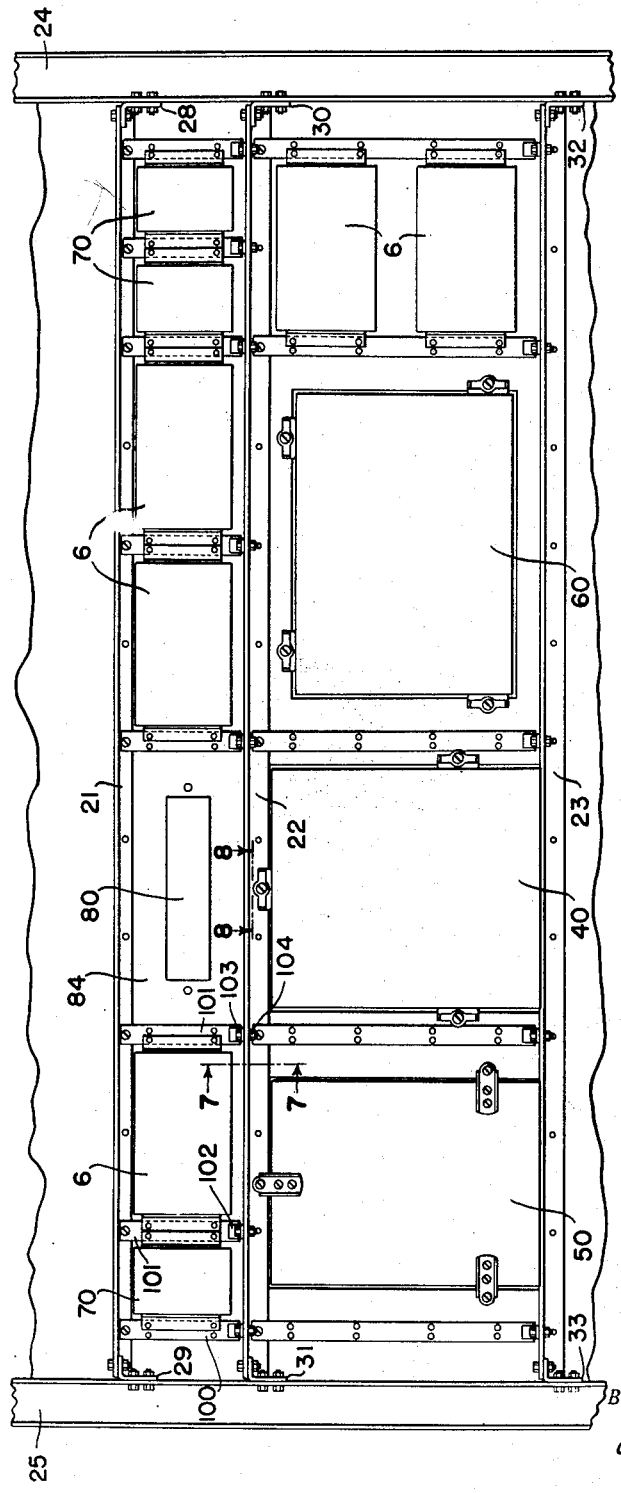
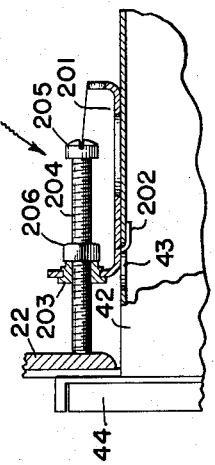
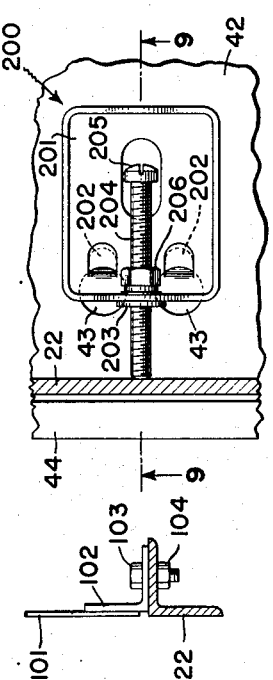
INVENTOR.
HENRY DREYFUSS
WILLIAM WINTERBOTTOM
KARL L. MAIER
BY Arthur H. Swanson
ATTORNEY Patented Oct. 13, 1953

2,655,176

UNITED STATES PATENT OFFICE 2,655,176

CONTROL PANEL

Henry Dreyfuss, Pasadena, Calif., William Winterbottom, New York, N. Y., and Karl L. Maier, Philadelphia, Pa., assignors to Minneapolis-Honeywell Regulator Company, Minneapolis, Minn., a corporation of Delaware Application September 28, 1950, Serial No. 187,336

2 Claims. (Cl. 137—552)

This invention relates to panels or boards on which are mounted the exhibiting elements and manually operable controls for an industrial process and also having thereon a graphic representation or flow diagram of said process.

A general object of the invention is to provide improvements in industrial control panels or boards which increase their usefulness in respect to ready comprehension, by an observer or operator, of the process under control while at the same time permitting a reduction in the size of the panel required. To that end separate spaces on the control panel or board are allocated to the flow diagram and to the associated instruments and control devices whereby the flow diagram may have such configuration and arrangement as is necessary for easy observation and comprehension and the associated instruments and control devices may be so located as to be most easily observed and manipulated. It is contemplated that the flow diagram may include therein suitable instruments for indicating the values of various factors in the process, thereby increasing the usefulness of the diagram without requiring any significant increase in size of the panel.

More specific objects of this invention are to provide improvements in panels for industrial process control permitting the use of an standardization upon time-tested control devices, in consequence of which, installation is facilitated, maintenance is simplified, and the need for new maintenance techniques and/or the stocking of additional replacement parts is eliminated.

An additional object of this invention is to provide a control panel, which, because of the arrangement of the flow diagram of the process under control, and the relative location on the panel of the exhibiting elements and control devices for the various controlled variables entering into the process, gives ready comprehension of the process under control and permits easy understanding of the process by an observer and/or easy training of an operator intended to have responsibility for its operation.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Figure 6 is a rear elevation of the parts shown in Figure 5.

Figure 7 is a vertical, transverse cross section on an enlarged scale on line 7—7 of Figure 6 as viewed in the direction of the arrows.

Figure 8 is a top plan view on an enlarged scale of one of the clamping means for holding one of the casings to the panel.

Figure 9 is a longitudinal cross section on line 9—9 of Figure 8.

For certain features of this invention reference may be had to a copending application of Henry Dreyfuss, Serial No. 187,355, filed September 28, 1950.

Figure 1:
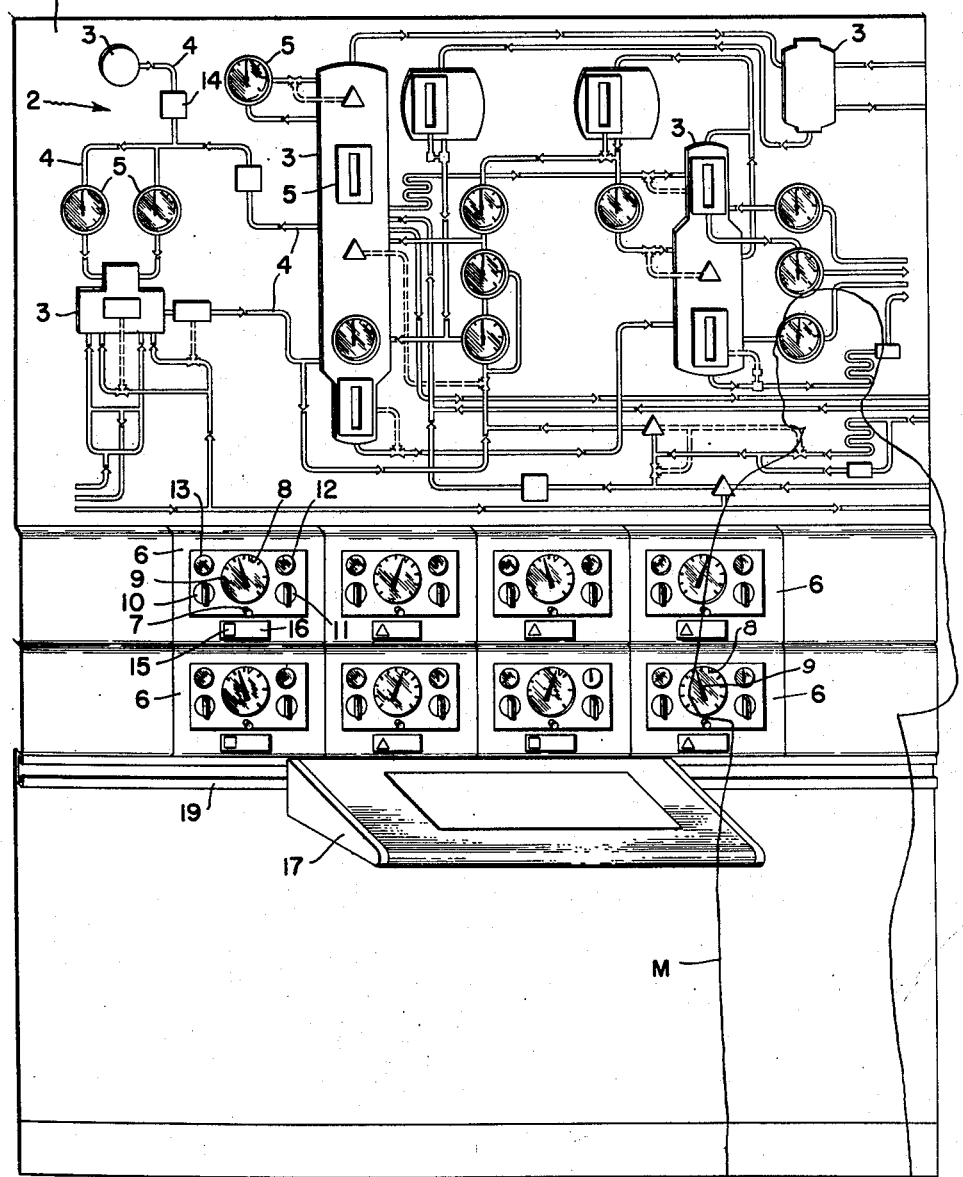
Figure 1 is a perspective view of the front of a panel.

Fig. 1 shows an instrument panel or control board 1 comprising a generally vertical sheet or wall conveniently fabricated from No. 10 U. S. gauge (0.1406 inch) stretcher leveled steel. Panels of three-sixteenth inch thickness and one-quarter inch thickness have been used but No. 10 gauge provides ample strength and rigidity for the majority of applications and is, of course, lower in cost. Panel or wall 1 may extend from the floor to a height which desirably may range in practice from a maximum of ninety-six inches to a minimum of seventy-two inches. The latter has been accepted as standard by the industries. To indicate the scale of the panel the figure of a man of average height is indicated in outline at M.

On the upper half of panel 1, so that it is at a convenient level for the eye of an operator of average height, is placed a graphic representation or flow diagram of the process under control. This graphic representation is generally designated by the reference character 2. That graphic representation or flow diagram 2 shown in Fig. 1 of the drawing is merely illustrative of one particular process. The graphic representation or flow diagram may be varied to correspond to the actual industrial process with which the control panel is used. The vertical dimension of the graphic representation or flow diagram 2 is made substantially smaller than the horizontal dimension in order to reduce the necessary vertical scanning by the eye of the operator to a minimum, since it has been discovered that the human eye takes more readily to horizontal than to vertical scanning. Graphic representation 2 can be made of separate elements attached to the panel 1 or may be painted or stencilled or otherwise marked directly on the panel 1. Representations of apparatus elements useful for carrying out the process are designated by the reference character 3. Representations of the various pipes or conduits used in the process are marked by the reference character 4. The pipes or conduits which appear in the graphic representation or flow diagram and which are designated in the drawings by the reference character 4 conduct the materials being processed and the processing fluids to and from the apparatus elements. Indicators or gauges 5 are located on the panel 1 at various points in the graphic representation 2 at which points the controlled variable, indicated by the gauges 5, is located in the process under control. These gauges 5 are actuated pneumatically, electrically, or hydraulically from distant measuring apparatus located at the point in the actual plant apparatus where the controlled variable performs its function in the actual process under control so that the gauges 5 suggest to the operator of the process not only the value of the controlled variable but also the relation of that value to the whole process.

Intermediate the top and bottom of the panel 1 and at a height convenient to the eyes and hands of the operator of the process is located a bank of indicating controllers, each designated by the reference character 6. A bank of eight of these controllers is shown arranged in two rows of four. However, the controllers 6 may be arranged in one, two, or three rows, as desired. Preferably, the lowest row of controllers is at a height of thirty inches from the ground for the convenience of the operator. Each of these controllers is formed as a unit and inserted in a hole in the panel 1. Controllers 6 are easily attached to or removed from panel 1. When a control unit is removed completely from the process, the corresponding controller 6 is removed from the control panel 1 and a cover plate is added to close up the unused portion of the panel 1. Since the controllers 6 are all of the same construction a description of one will suffice. The controllers illustrated may be similar to those shown in the following U. S. patents or applications therefor: 2,125,081, C. B. Moore, July 26, 1938; 2,216,448, C. B. Moore, October 1, 1940; 2,369,887, D. P. Eckman, February 20, 1945; 2,381,948, L. Gess, August 14, 1945; application S. N. 48,856, L. Gess, filed September 11, 1948.

Each of the controllers 6 is a compact indicating controller manufactured by the inventor's assignee and has two indicating means. One of these means is the pointer 8 which travels around the edge or rim of the dial of the controller 6. The other of these means is the centrally mounted pointer 9. Both these indicating means cooperate with the same set of numerals adjacent the edge of the controller dial. The pointer 8 appears on the drawings as a small triangle or V-shape in outline. The indicator 9 appears on the drawing in black. Each controller may be quite compact and, in an operative embodiment of the invention, occupies a panel space of only eight and five-eighths by eleven and three-quarters inches. The controllers 6 are air-operated in conjunction with a non-indicating, air-operated transmitter mounted adjacent a conventional, air-operated, diaphragm motor valve located near a point in the process-controlling apparatus where a measurement and control of the controlled variable of the process at that point is made. Such readings are transmitted to the controller 6 by means of which, in turn, the valve may be controlled. Knob 7 may be manually operated to move a pointer 8 to indicate the air pressure at which the controller for the valve is set. The indicator of 9 shows the instantaneous value of the controlled variable. The manually operable knob 10 is adjustable to switch the controller to various positions known as Automatic, Service, Test, or Manual. In Automatic position the valve is governed by the measuring instrument in the controller adjacent that valve. In the Manual position the valve may be moved by manually adjusting knob 11. The air pressure available for exercising this Manual control is indicated by gauge 12. The pressure of the air actually applied to the diaphragm motor of the final control valve, whether the controller is in Automatic or Manual position, is indicated by the gauge 13.

In lieu of the compact indicating controller 6, a square-case indicating or recording controller may be used. Such controllers are manufactured by the inventor's assignee. A square-case controller is exactly twice the size of one controller 6 so that one such square-case controller can readily be interchanged on the panel 1 for two controllers 6. Such interchangeability permits a great variety of industrial processes to be controlled by panels of this invention and a great variety of controllers, which may be mounted on such panels, to control steps in such processes.

In order to simplify, as far as possible, the control of the process under control and to correlate the controls with the apparatus elements controlled thereby, a code system is used. According to this code system, identification of the controller 6 with respect to its point of application on the flow diagram 2 is accomplished by means of color. Identification of each particular variable under control is effected by means of the form of a symbol.

Figure 2:
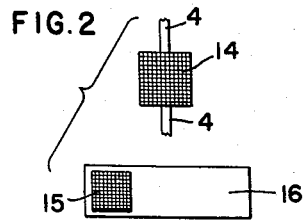
Figure 2 is a front view on an enlarged scale of two of the coding devices or markers.
Figure 3:
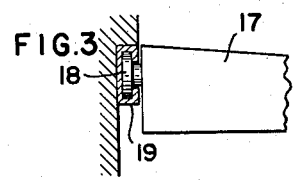
Figure 3 is a view of the desk on an enlarged scale in partial side elevation with part of the panel in vertical cross section.

Fig. 2 gives an example. A marker 14 is located in the upper, left hand corner of the graphic representation 2 in the pipes or conduits 4. A corresponding marker 15 is attached to the upper, left controller 6. Marker 15 may conveniently be located on the name plate 16 of the controller 6 to which it is applied. These markers may be simply symbols painted, stencilled or otherwise formed on the graphic representation 2 and on the controller 6. Preferably, however, markers 14 and 15 are pieces of metal or other suitable material having means for their ready attachment to and detachment from the panel 1 and the controller 6. Thus, when a controller is disconnected from an apparatus element located at one particular point in the process or is connected to another apparatus element located at another point in the process, suitable changes in or substitutions of the markers 14 or 15 may be made. In the example shown, the markers 14 and 15 are both square shaped to show that the controller 6 controls a pressure at this point in the process. The markers 14 and 15 are both colored red to show that this controller governs the process controlling apparatus at that point in the process.

In order to enable the operator to conveniently make records or notes a desk 17 may be provided.

Rollers 18 (or other convenient means) are secured to desk 17 and interengage with and provide guided movement along stationary elements, such as a stationary, U-shaped girder or track 19. The desk 17 is located so as not to overlie and thus obscure the graphic representation 2 or the controllers 6 and is at a convenient height above the floor for an observer or operator to write notes or take other data at the desk while observing the graphic representation 2 and the controllers 6.

The modification of Figs. 4 through 9

Figure 4:
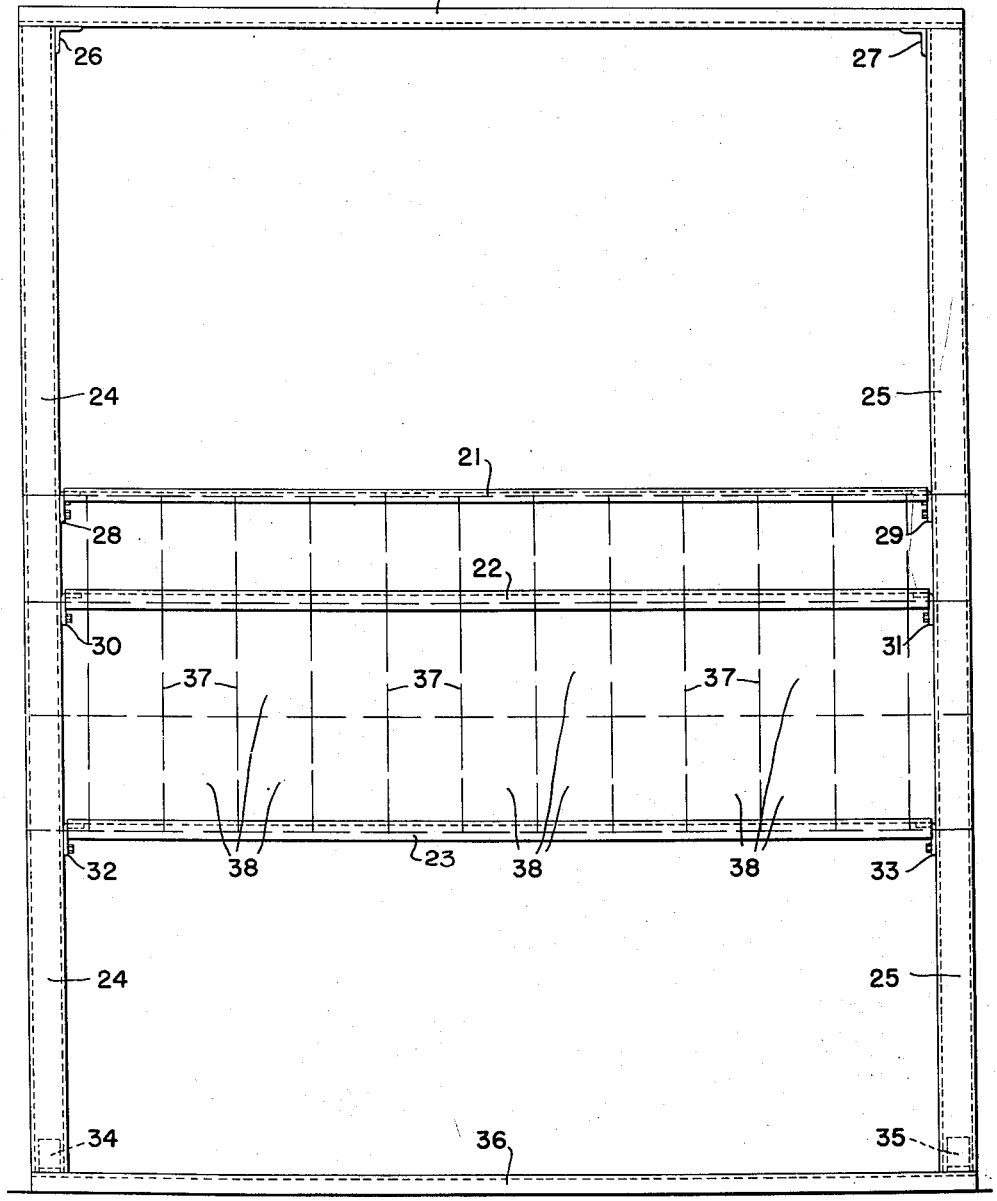
Figure 4 is a front elevation of the supporting frame for a panel before the flow diagram, the exhibiting elements, or the control devices are mounted on it.
Figure 5:
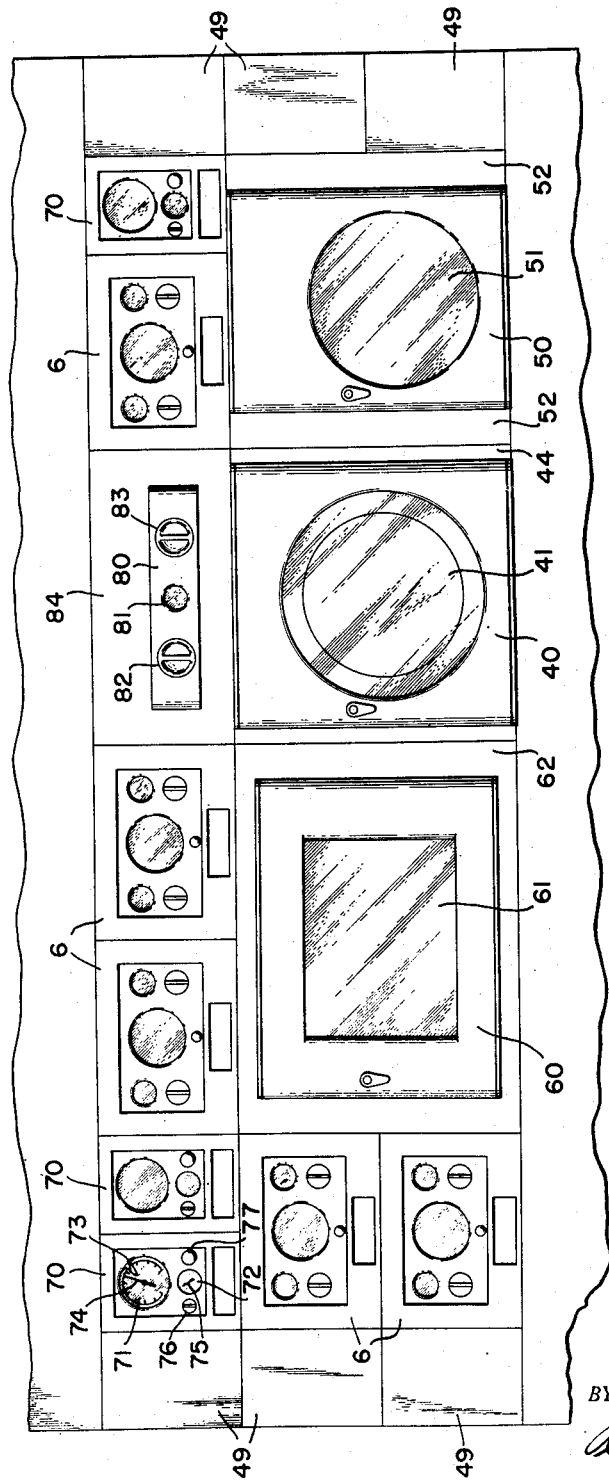
Figure 5 is a front elevation of the middle portion of the panel on an enlarged scale showing various exhibiting elements and control devices mounted in the panel.

Fig. 4 shows the frame assembly for the instrument panel or control board. This frame assembly is made up of angle iron, conveniently 1½ inch by 1½ inch by ¼ inch. There are four of these angle irons forming the horizontal cross pieces 20, 21, 22 and 23. There are two vertical pieces 24 and 25 consisting of U-shaped channels, conveniently 3-inches by 1½-inches. The horizontal angle irons are attached to the vertical supports, as by welding, by brackets 26 and 27 at the upper corners. The horizontal angle irons 21, 22 and 23 are connected to the vertical supports 24 and 25 by means of support brackets 28, 29, 20, 31, 32 and 33. These support brackets may be bolted to the horizontal angle irons and to the vertical channels by ⅜-inch bolts or otherwise secured thereto. At their lower ends, the vertical channels 24 and 25 are welded or otherwise secured firmly to support feet 34 and 35 which are screwed or otherwise firmly secured to a horizontal channel 36 conveniently of 4-inch U-shaped channel. The vertical dotted lines 37 mark off horizontal increments 38 of space, which are located at the middle portion of the instrument panel or control board. The rectangular space bounded by the angle irons 20 and 21 and the vertical channels 24 and 25 is normally covered with a panel of No. 10 gauge sheet steel. The rectangular space bounded by the angle irons 23 and 36 and by the vertical channels 24 and 25 is normally covered with a second panel of No. 10 gauge sheet steel. This leaves a rectangular opening in the central part of the panel which can be filled in with one or more controllers 6 as shown in Fig. 1 or with a variety of instruments as shown in Fig. 5. The arrangements shown in Figs. 1 and 5 are only a pair of a large number of arrangements which can be used. The choice of the arrangement used is governed by the process which is to be controlled.

An important feature of this invention is the provision of supports for the exhibiting elements and controls which are mounted on the instrument panel or control board. These supports take the form of rectangular casings. These casings can be interchangeably attached to and detached from the panel if any change is made in the process under control or if a different process is to be controlled. To facilitate this interchangeability, the supports have their vertical and horizontal dimensions made of a size which is a whole fraction of the rectangular space into which the supports are to be mounted. The vertical and horizontal dimensions of the other supports are then multiples of this whole fraction. Thus the supports may be two, three, or four times as wide as the narrowest support. Likewise, the supports or casings may be twice as high as the smallest casing. This is shown in detail hereinafter.

Fig. 5 shows a circular chart recorder 40 enclosed in a rectangular casing 42 having a hinged cover or door having a circular opening 41 through it. Opening 41 is covered by a pane of glass or like transparent material so that a circular recording-receiving chart is visible therethrough. Instrument 40 occupies three of the horizontal spaces 38 separated by the dotted lines 37 in Fig. 4.

To the right of instrument 40 is a second, rectangular-case, circular-chart recorder 50 having in its hinged cover a round opening 51 closed by a pane of glass or like transparent material to render visible the disc-shaped, record-receiving chart beneath it. Instrument 50 does not occupy the full horizontal space represented by three of the spaces 38 separated by the dotted lines 37 in Fig. 4. Therefore, in order to fill out this space, two vertical tiles 52, each consisting of a sheet of strip steel, are used one on each side of the case of instrument 50. Tiles 52 cooperate with the front of the case to completely close the opening in the control board.

To the left of instrument 40 is a recorder 60 which is a rectangular-case, strip-chart instrument having a rectangular opening 61 in its hinged cover. A pane of glass closes opening 61 so as to expose for view the strip, record-receiving chart upon which the pen of the recorder 60 makes record marks. The rectangular case of instrument 60 is too large to be placed in the space represented by three of the horizontal spaces 38 separated by the dotted lines 37 in Fig. 4. Therefore, a rectangular frame 62 is used whose outer dimensions occupy the horizontal space equal to four of the horizontal spaces 38 laid off by the dotted lines 37. The inner rectangular opening in frame 62 is just large enough to fit snugly the outside of the rectangular case of instrument 60.

To the left of instrument 60 are a pair of controllers 6 similar to those described in Fig. 1. It will be noted that the controllers 6 have a vertical dimension which is half the vertical dimension of instruments 40, 50, and 60. Controllers 6 have a horizontal dimension which is equal to two of the horizontal spaces 38 laid off by the dotted lines 37 in Fig. 4. By reference to Fig. 4, it will be seen that the instruments 40, 50 and 60 and the two controllers 6, referred to, are mounted in the instrument panel or control board in the space between the horizontal angle irons 22 and 23. The controller casings are secured to these angle irons 22 and 23 by brackets or similar fastening means now customarily employed for mounting casings on instrument panels or control boards. In order to to close the remaining openings in the instrument panel or control board, tiles 49 are used which have a vertical dimension equal to that of the controller 6 and a horizontal dimension equal to that of one of the horizontal spaces 38 marked off by the dotted lines 37.

The opening between the horizontal angle irons 21 and 22 is closed by a plurality of devices. At the left is a tile 49. Next is an indicating, receiver-controller 70 mounted in a rectangular case having the same external dimensions as tile 49. In one operative embodiment the case occupies a panel space of 5-inches by 6½-inches. Its horizontal dimension is equal to one of the horizontal spaces 38 between the dotted lines 37 in Fig. 4. Through the front of this rectangular case are circular openings 71 and 72 each closed by a glass or other transparent pane to expose the dial face of the instrument beneath. The pointer 73 indicates the air pressure to which the controller is set. This setting is done manually. The pointer 74 indicates the air pressure proportional to that variable of the process which is under the control of this controller. The pointer 75 indicates the air pressure applied to the final control valve. A manually operable handle or knob 76 provides means for switching control of the valve connected to instrument 70 from "Manual" to "Automatic" control or vice versa. The manually operable knob 77 provides means for adjusting a controller set point, as indicated by the pointer 73, and for operating the final control valve under the control of instrument 70. Instrument 70 contains a pneumatic transmitter element which enables the operator to adjust the set-point of a remotely located controller.

To the right of the controller 70, just described, is a duplicate controller 70. Next come two controllers 6. Next comes a manual bypass panel 80 comprising a rectangular-case pneumatic transmitter having a gauge 81 in its center. To the left side of panel 80 is a manually operable handle 82 and to the right a second manually operable handle 83. This manually operable bypass panel is mounted in a rectangular frame 84 whose horizontal dimension is equal to three of the horizontal spaces 38 marked off by the dotted lines 37. Next to the right comes a controller 6. Next to the right is a controller 70. The final space is closed by a tile 49.

Fig. 6 shows the rear of the instrument panel or control board and the means by which the supports or casings are mounted thereon. For example, in the upper left corner of Fig. 6 one of the controllers 70 is shown mounted between the horizontal angle irons 21 and 22 by means of a pair of vertical straps 100 and 101 which are secured at their upper ends to the angle iron 21 and at their lower ends to the angle iron 22.

Fig. 7 shows one way in which the strap 101 (and in fact all these straps) may be attached to the lower angle irons. Fig. 7 shows that strap 101 is attached at its lower end to a short angle iron or bracket 102 by welding or other convenient means. The horizontal face of angle iron 102 abuts the horizontal face of angle iron 22 and is secured thereto by a bolt 103 and a nut 104 or by other similar convenient means.

Figs. 8 and 9 show the means by which the larger rectangular instrument casing of the circular chart recorder 40, for example, is attached to the instrument panel or control board. Recorder 40 has a casing 42 with holes 43 in it. The front of this casing has a vertically projecting flange 44. Flange 44 overlies the front, vertical face of angle iron 22. A bracket 200 has a body portion 201 on which are downwardly projecting tangs 202. Tangs 202 pass through the holes 43 in the casing 42. Body 201 has, in its vertical face, a screw threaded bushing 203. Passing through bushing 203 and fitting with the screw threads therein is a screw driver. A lock nut 206 is adjustable along screw 204 to limit its movement to the left.

Casing 42 is slid into the opening formed by angle irons 22 and 23 until flange 44 is very close the front faces of angle irons 22 and 23. Screw 204 is then tightened or turned so that it moves to the left. This forces tangs 202 against the right wall of holes 43 and draws flange 44 into abutting engagement with the front, vertical face of angle iron 22.

The vertical sheet or wall of the modification shown in Fig. 1 and the sheets which are applied to the modification of Figs. 4–9 and which cover the rectangular space bounded by the angle irons 20 and 21 and the vertical channels 24 and 25 and which cover the rectangular space bounded by the angle irons 23 and 36 and the vertical channels 24 and 25 may be of other materials than the No. 10 gauge sheet steel as described above. Suitable examples of such other materials are: ply metal, which is a panel made of a layer of metal, a layer of plywood and a second layer of metal; plywood; or other material having sufficient strength and of sufficiently low cost, such as pressed wood.

Since the pictorial flow diagram need support no appreciable weight, it can be fabricated of some relatively light material, such as plywood, thus permitting expansion or changes in the diagram, at minimum cost. This permits the upper part of the panel to be light in weight while the lower portion of the panel must be stronger in order to support the controllers on it and must therefore be heavier.

While in accordance with the provisions of the statutes, we have illustrated and described the best form of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention what we claim as new and desire to secure as Letters Patent is:

1. Means for providing at one location for the convenience of the operator all the information and controls necessary for the operation of an industrial process, said means including: a frame assembly having a flat panel thereon and a space therein; a graphic representation on said panel of the process under control; indicators mounted on said panel at various points of the graphic representation, which points correspond to the points at which the controlled variable indicated by the indicator is located in the process under control; a plurality of rectangular casings mounted in the space in said frame assembly and forming housings for gauges measuring variables which enter into said process under control, the smallest of said casings having a height and width such that a number of said casings fit evenly into the height and width of said space, and others of said casings have heights and widths which are multiples of the heights and widths of the smallest casing; manually operable controls located on said frame assembly beneath said graphic representation and convenient to the hand of the operator for varying, from said control location, the values of said controlled variables; a marker on that portion of said graphic representation where the representation of an apparatus element controlling a control variable is located; and a marker on the control for said apparatus element, said markers having similar indices indicating to the operator that they are related.

2. A machine for controlling an industrial process from a single control location, including: a panel supporting a plurality of rectangular casings, the smallest of said casings having a height and a width such that a number of said casings fit evenly into a space of a given height and width, and others of said casings having heights and widths which are multiples of the heights and widths of said smallest casing; a graphic representation of the process under control mounted on said panel immediately above said casings at a height so that the middle of said graphic representation is approximately at the level of the eye of an average man and the vertical dimension of the graphic representation subtends a convenient angle of vision for an average man, said graphic representation including, representations of the apparatus elements useful for carrying out the process, representations of the conduits useful for conducting the materials to be processed and the processing fluid to and from said apparatus elements, and indicators located in places in said graphic representation corresponding to the place at which the apparatus represented by said representation is located in the actual plant apparatus, whereby said indicators suggest to the operator of the process not only the value of the controlled variable but also the relation of that variable to the whole process; manually operable controls having operating elements controlling connections with remotely located, adjustable apparatus elements; and indicators associated with said controls for indicating the operating condition of said controls and of the apparatus elements controlled thereby, said operating elements and their associated indicators being mounted on said panel immediately beneath said graphic representation and convenient to the hand and eye of an average man.

HENRY DREYFUSS.
WM. WINTERBOTTOM.
KARL L. MAIER.

References Cited in the file of this patent

UNITED STATES PATENTS

| Number | Name | Date |
|---|---|---|
| 2,010,338 | White | Aug. 6, 1935 |
| 2,145,798 | Merkell | Jan. 31, 1939 |
| 2,438,453 | Powell | Mar. 23, 1948 |
| 2,555,039 | Bissonette | May 29, 1951 |

OTHER REFERENCES

Time Code Control System.